Figure 1:
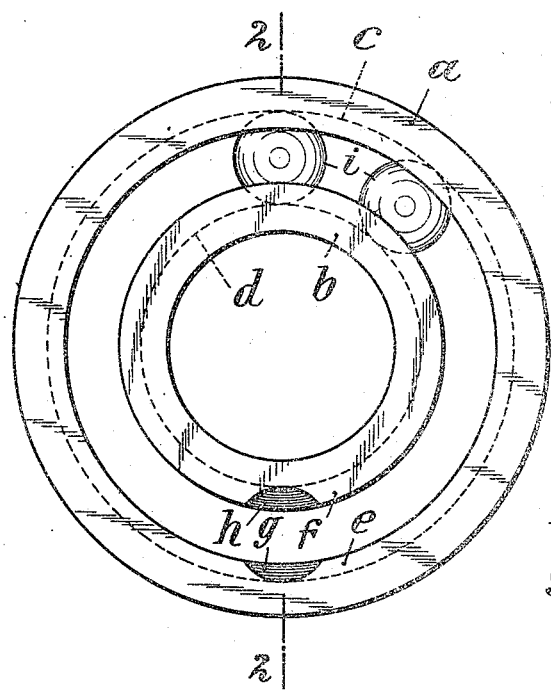

A. MARRECK.
BALL BEARING.
APPLICATION FILED OCT. 5, 1914.

1,165,992.

Patented Dec. 28, 1915.

Witnesses:
R. Sommers
E. Leckert

Inventor
August Marreck.
By Henry Ortz Jr
atty.

UNITED STATES PATENT OFFICE.

AUGUST MARRECK, OF WAIDMANNSLUST, GERMANY.

BALL-BEARING.

1,165,992.  Specification of Letters Patent.  Patented Dec. 28, 1915.

Application filed October 5, 1914. Serial No. 865,077.

*To all whom it may concern:*

Be it known that I, AUGUST MARRECK, a citizen of the German Empire, and residing at Waidmannslust, Germany, have invented certain new and useful Improvements in Ball-Bearings, of which the following is a specification.

This invention relates to ball-bearings having in the shoulder of one or both rings a lateral inlet through which the balls are inserted into the ball-races. Such ball-bearings have the disadvantage that the balls running by the shoulder of the ring opposite the inlet are pressed toward the recess in the other shoulder forming the inlet, and the consequence is that the bearing is very noisy and is soon destroyed. This defect occurs particularly in those ball-bearings in which the lateral recesses in the shoulders of the rings do not extend to the bottom of the ball-races, but a small elevation remains between the bottom of the ball-race and the base of the recess; as a rule the balls are forced over this elevation into the ball-race, or it is overcome by the rings being tilted or twisted when inserting the balls. As the balls and rings are seriously damaged when the balls are inserted in this manner, the prejudicial consequences due to the balls being pressed when running against the small elevations on the rings at the inlets are still greater than in those bearings in which the balls are introduced into the ball-race without pressure.

A primary object of this invention is to provide an improved ball-bearing of the type described to which these defects are not attached. To this end the ball-race of one or both rings is flattened at the lateral inlet from the bottom of the ball-race toward the shoulder located opposite the inlet. This flat part of the ball-race at the inlet can be made by making the curvature of the ball-race at that place of a radius larger than the normal radius of curvature of the ball-race.

A ball-bearing according to the invention has the advantage that the bottoms of the ball-races are entirely uninjured along the entire periphery, and when the balls pass the inlet they are perfectly free because the ball-race at the inlet is enlarged toward the shoulder located opposite the inlet. The consequence is that in a ball-bearing according to the invention all tendency of the balls to run into the inlet is negatived and the balls constantly remain in their track. Owing to the above described advantages a ball-bearing made according to the invention has the additional advantage that it can be very severely loaded.

To these ends the invention consists in the construction, arrangement and combination of parts described hereinafter and pointed out in the claims.

One illustrative embodiment of the invention and a modification thereof are represented by way of example in the accompanying drawing, wherein:—

Figure 2:
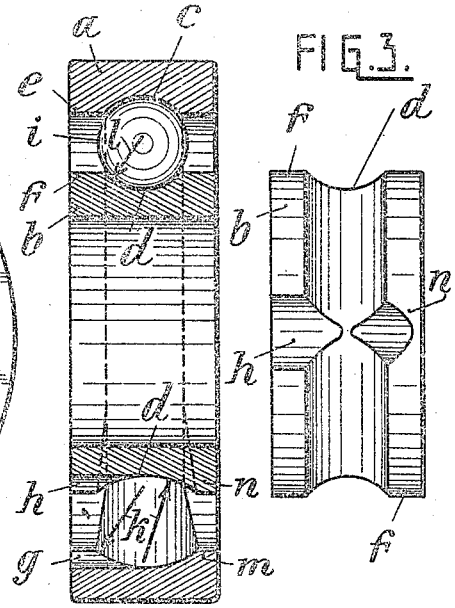
Figure 3:
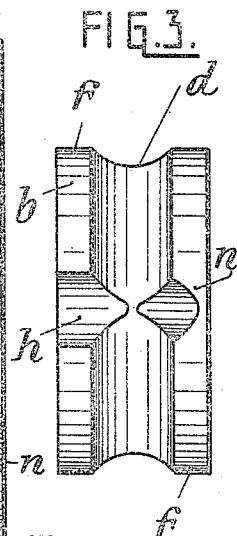
Figure 4:
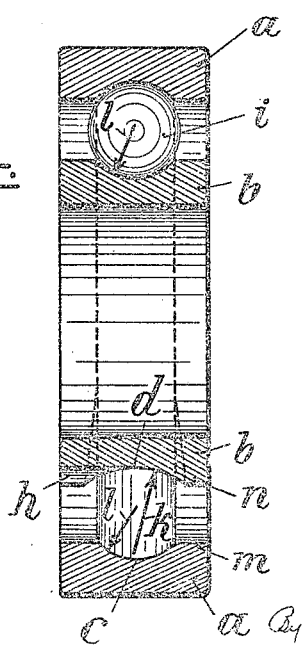

Figure 1 is a side elevation of an improved ball-bearing comprising two rings for one row of balls, Fig. 2 is a cross-section taken on the line 2—2 in Fig. 1, and Fig. 3 is an end elevation of the inner ring; Fig. 4 is a cross-section of a modification, in which only the shoulder of the inner ring is provided with a lateral recess for introducing the balls.

Referring firstly to Figs. 1 to 3, the ball-bearing comprises the outer ring $a$ and the inner ring $b$ having, respectively, the ball-races $c$ and $d$ of generally normal form. At one place both the shoulder $e$ of the outer ring $a$ and also the shoulder $f$ of the inner ring are provided with a recess $g$ and $h$, respectively, for inserting the balls $i$ between the rings $a$ and $b$; if desired, these recesses may be closed by closure members of suitable shape. As Fig. 2 clearly shows, at the place where the recess $h$ is located the race $d$ has a curvature different from that of the remainder of the race, the radius of curvature $k$ of the race at this place being larger than the normal radius of curvature $l$ of the race $d$. The bottom of the race at the part having the radius of curvature $k$ is located, however, at the same distance from the center of the ring $b$ as the remainder of the bottom of the race. In the illustrative embodiment the race $c$ of the outer ring $a$ is made at the recess $g$ exactly corresponding to the race $d$ at the part having the recess $h$. Owing to such a construction of the ball-races $c$ and $d$ when the balls run the shoulders $m$ and $n$ of the rings $a$ and $b$ can no longer force the balls in an undesirable manner against the recesses $g$ and $h$, as is the case in other bearings.

Referring now to Fig. 4, this ball-bearing differs from that just described above in that only the inner ring $b$ has a recess, while the outer ring $a$ is not provided with one. In such a ball-bearing it is sufficient when only the inner ball-race is flattened toward both sides at the place where the recess $h$ is located, the curvature of the race at this place having the radius $k$.

Although the invention has been described above with reference to ball-bearings having one row of balls it is to be understood that it is equally applicable to bearings having two or more rows of balls.

What I claim and desire to secure by Letters Patent of the United States is:—

1. In a ball-bearing, the combination of an inner ring having a ball-race in the outer periphery thereof, and an outer ring having a ball race in the inner periphery thereof, the one shoulder of one of the rings having a lateral recess constituting an inlet for balls, and the wall of the ball-race of the ring having said inlet being flattened toward the other shoulder opposite said recess, for the purpose specified.

2. In a ball-bearing, the combination of an inner ring having a ball-race in the outer periphery thereof, and an outer ring having a ball race in the inner periphery thereof, the one shoulder of each of the rings having a lateral recess constituting an inlet for balls, and each wall of the ball-race being flattened toward the other shoulder opposite said inlet, for the purpose specified.

3. In a ball-bearing, the combination of an inner ring having a ball-race in the outer periphery thereof, and an outer ring having a ball-race in the inner periphery thereof, the one shoulder of one of the rings having a lateral recess constituting an inlet for balls, the radius of curvature of that part of the ball-race in the recessed ring being larger at the said recess than elsewhere, and the maximum depth of all parts of the ball-race in the recessed ring being constant, for the purpose specified.

4. In a ball-bearing, the combination of an inner ring having a ball-race in the outer periphery thereof, and an outer ring having a ball-race in the inner periphery thereof, the one shoulder of each of the rings having a lateral recess constituting an inlet for the balls, the radius of curvature of that part of each ball-race which is located at the inlet being larger than elsewhere, and the bottom of each ball-race constituting the circumference of a circle, for the purpose specified.

In testimony whereof, I affix my signature in the presence of two witnesses.

AUGUST MARRECK.

Witnesses:
 WOLDEMER HAUPT,
 HENRY HASPER.